United States Patent [19]
Woo et al.

[11] Patent Number: 5,425,101
[45] Date of Patent: Jun. 13, 1995

[54] SYSTEM AND METHOD FOR SIMULTANEOUSLY AUTHORIZING MULTIPLE VIRTUAL CHANNELS

[75] Inventors: Arthur S. Woo; Wayne S. Sheldrick; Gary W. C. Chan, all of Scarborough, Canada

[73] Assignee: Scientific-Atlanta, Inc., Norcross, Ga.

[21] Appl. No.: 160,848

[22] Filed: Dec. 3, 1993

[51] Int. Cl.⁶ .............................................. H04L 9/00
[52] U.S. Cl. .......................................... 380/23; 380/9; 380/10; 380/20; 380/25; 380/49; 370/60; 370/94.1
[58] Field of Search ....................... 380/3–5, 380/9, 10, 20, 23, 25, 49, 50; 370/60, 60.1, 80, 93, 94.1, 110.1, 58.1

[56] References Cited

U.S. PATENT DOCUMENTS

| | | | |
|---|---|---|---|
| 4,009,345 | 2/1977 | Flemming et al. | 370/93 |
| 4,009,346 | 2/1977 | Parker et al. | 370/80 |
| 4,218,756 | 8/1980 | Fraser | 370/94.1 X |
| 4,587,514 | 5/1986 | Schas et al. | 341/87 |
| 4,652,903 | 3/1987 | Lucas | 348/489 |
| 4,697,277 | 9/1987 | Van Rassal | 375/116 |
| 4,723,283 | 2/1988 | Nagasawa et al. | 380/20 |
| 4,763,357 | 8/1988 | Barr | 380/48 |
| 4,787,085 | 11/1988 | Suto et al. | 370/110.1 |
| 4,817,142 | 3/1989 | Van Rassal | 380/15 |
| 4,829,569 | 5/1989 | Seth-Smith et al. | 380/10 |
| 4,866,770 | 9/1989 | Seth-Smith et al. | 380/20 |
| 4,890,321 | 12/1989 | Seth-Smith et al. | 380/20 |
| 4,907,220 | 3/1990 | Rau et al. | 370/60 |
| 4,908,859 | 3/1990 | Bennett et al. | 380/10 |
| 4,994,909 | 2/1991 | Graves et al. | 348/7 |
| 5,029,207 | 7/1991 | Gammie | 380/10 |
| 5,062,105 | 10/1991 | McKnight et al. | 370/84 |
| 5,119,369 | 6/1992 | Tanabe et al. | 370/60 |
| 5,200,823 | 4/1993 | Yoneda et al. | 348/473 |
| 5,212,691 | 5/1993 | Hokari | 370/110.1 |
| 5,237,610 | 8/1993 | Gammie et al. | 380/10 |
| 5,280,470 | 1/1994 | Buhrke et al. | 370/60.1 X |
| 5,303,233 | 4/1994 | Sugawara | 370/60 |
| 5,311,506 | 5/1994 | Beisel | 370/58.1 |
| 5,313,455 | 5/1994 | Van der Wal et al. | 370/60 X |

OTHER PUBLICATIONS

Four (4) Viewgraphs, presented in confidence Mar. 9–10, 1992, (Unpublished).
Wasilewski, Anthony J., "Requirements and Method for High-Level Multiplexing of MPEG and Other Digital Service Bitstreams with Universal Transport Layer", International Organization for Standardization, ISO/IEC/JTCI/SC2/WG11 MPEG 92(Nov. 2, 1992).
Wasilewski, Anthony J., "Syntax Proposal for MPEG-2 Transport Stream Program Specific Information", International Organization for Standardization, ISO/IEC/JTC1/SC29/WG11 MPEG 93/ (Jul 1993).
Beddow, David P., "The Virtual Channels Subscriber Interface", Communications Technology, pp. 48–49; (Apr. 30, 1992).

Primary Examiner—Bernarr E. Gregory
Attorney, Agent, or Firm—Banner, Birch, McKie & Beckett

[57] ABSTRACT

A decoder in a multiservice communication system receives a plurality of services as data streams, including video, audio, teletext, and utility data, multiplexed in sequence of frames. Each service defines a virtual channel. Virtual channel packets contained in the multiplex include information for locating the data streams that compose the virtual channels and information for decrypting the data streams. Each virtual channel packet is transmitted in the multiplex each session of frames. When a user selects more than one virtual channel at a given time, the decoder extracts a virtual channel packet for a first selected virtual channel in a first session. The decoder can then provide the decrypted data streams for the first selected virtual channel to peripheral equipment. The decoder stores the information for locating and decrypting such data streams. In each succeeding session, the decoder extracts another selected virtual channel packet and provides the decrypted data streams for that selected virtual channel and for all previously authorized selected virtual channels. When a virtual channel packet for each selected virtual channel has been processed, the decoder repeats the cycle thereby providing the data streams for each selected virtual channel.

16 Claims, 11 Drawing Sheets

| FIELD DESCRIPTION | BITS |
|---|---|
| HEADER ID = 52x | 8 |
| VIRTUAL CHANNEL NUMBER | 12 |
| SERVICE CATAGORY | 5 |
| SERVICE NUMBER | 6 |
| WAIT FOR BLACKOUT/SPOTLIGHT AUTHORIZATION CYCLE | 1 |
| WAIT FOR VIDEO/RADIO/TEST TIER POINTER CYCLE | 1 |
| ENCRYPTED CYCLE COMMAND | 4 |
| ENCRYPTED CYCLE DATA | 24 |
| CYCLING DATA ID BIT | 1 |
| INVERSE TIER AUTHORIZATION | 1 |
| VIDEO/RADIO/TEXT TIER POINTER | 8 |
| RIGHT-TO COPY (RTC) TIER POINTER | 6 |
| DATA SERVICE TIER POINTER | 6 |
| RTC ENABLE | 1 |
| RTC PURCHASE ENABLE | 1 |
| RTC COST | 8 |
| FORCE TRACKING OF PROGRAM | 1 |
| PPV ENABLE | 1 |
| PROGRAM NUMBER | 14 |
| EVENT COST | 16 |
| FREE/PREVIEW TIME | 4 |
| FORCED TRACKING DELAY | 4 |
| HDTV PORT | 1 |
| FINGERPRINT TRIGGER | 1 |
| PORT CONTROL PINS | 8 |
| MATURITY RATINGS | 3 |
| REASSIGN VIDEO CHANNEL #1 TO DATA | 1 |
| REASSIGN VIDEO CHANNEL #2 TO DATA | 1 |
| REASSIGN AUDIO CHANNEL #1 TO DATA | 1 |
| REASSIGN AUDIO CHANNEL #2 TO DATA | 1 |
| REASSIGN AUDIO CHANNEL #3 TO DATA | 1 |
| REASSIGN AUDIO CHANNEL #4 TO DATA | 1 |
| EMBEDDED AUDIO CHANNEL #1 ENABLED | 1 |
| EMBEDDED AUDIO CHANNEL #2 ENABLED | 1 |
| EMBEDDED AUDIO CHANNEL #3 ENABLED | 1 |
| EMBEDDED AUDIO CHANNEL #4 ENABLED | 1 |

FIG.4A

| | |
|---|---|
| PHYSICAL VIDEO CHANNEL #1 | 5 |
| PHYSICAL VIDEO CHANNEL #2 | 5 |
| PHYSICAL AUDIO CHANNEL #1 | 6 |
| PHYSICAL AUDIO CHANNEL #2 | 6 |
| PHYSICAL AUDIO CHANNEL #3 | 6 |
| PHYSICAL AUDIO CHANNEL #4 | 6 |
| PHYSICAL UTILITY DATA CHANNEL | 4 |
| PHYSICAL TEST SERVICE NUMBER | 5 |
| STARTING TEXT SERVICE PAGE NUMBER | 11 |
| SPARES | 30 |
| PACKET CHECK (REPEAT VIRTUAL CHANNEL NUMBER + SPARE) | 16 |
| TOTALS | 256 |

FIG.4B

|  | V1 | V2 | A1 | A2 | U | T |
|---|---|---|---|---|---|---|
| STREAM # |  |  |  |  |  |  |
| VC# |  |  |  |  |  |  |

FIG.9

|  | V1 | V2 | A1 | A2 | U | T |
|---|---|---|---|---|---|---|
| STREAM # | 3 | 0 | 5 | 0 | 0 | 0 |
| VC# | 1 | 0 | 1 | 0 | 0 | 0 |

FIG.10A

|  | V1 | V2 | A1 | A2 | U | T |
|---|---|---|---|---|---|---|
| STREAM # | 3 | 0 | 5 | 0 | 7 | 0 |
| VC# | 1 | 0 | 1 | 0 | 4 | 0 |

FIG.10B

|  | V1 | V2 | A1 | A2 | U | T |
|---|---|---|---|---|---|---|
| STREAM # | 3 | 8 | 5 | 4 | 7 | 0 |
| VC# | 1 | 9 | 1 | 9 | 4 | 0 |

FIG.10C

|  | V1 | V2 | A1 | A2 | U | T |
|---|---|---|---|---|---|---|
| STREAM # | 8 | 0 | 3 | 0 | 0 | 0 |
| VC# | 7 | 0 | 7 | 0 | 0 | 0 |

FIG.11A

|  | V1 | V2 | A1 | A2 | U | T |
|---|---|---|---|---|---|---|
| STREAM # | 1 | 0 | 2 | 0 | 0 | 0 |
| VC# | 6 | 0 | 6 | 0 | 0 | 0 |

FIG.11B

SYSTEM AND METHOD FOR SIMULTANEOUSLY AUTHORIZING MULTIPLE VIRTUAL CHANNELS

This application is related by subject matter to U.S. patent application Ser. No. 08/161,160, entitled "System and Method for Transmitting a Plurality of Digital Services Including Imaging Services" and filed Dec. 3, 1993; U.S. patent application Ser. No. 08/160,828, entitled "System and Method for Transmitting a Plurality of Digital Services Including Compressed Imaging Services and Associated Ancillary Data Services" and filed Dec. 3, 1993; U.S. patent application Ser. No. 08/160,841, entitled "Memory Efficient Method and Apparatus for Synch Detection" and filed Dec. 3, 1993; U.S. patent application Ser. No. 08/161,159, entitled "A Multi-Service Data Receiver Architecture" and filed Dec. 3, 1993; U.S. patent application Ser. No. 08/160,827, entitled "System and Method for Providing Compressed Teletext Services and Teletext Support Services" and filed Dec. 3, 1993; and U.S. patent application Ser. No. 08/160,830, entitled "System and Method for Transmitting and Receiving Variable Length Authorization Control for Digital Services" and filed Dec. 3, 1993.

I. BACKGROUND OF THE INVENTION

A. Field of the Invention

The present invention relates generally to digital signal transmission and reception, and more particularly, to a system and method for simultaneously authorizing a plurality of virtual channels of multiplexed digital services, including imaging services.

B. Description of the Relevant Art

With the growing trend toward a merger of the previously separate technologies of telecommunications including voice and data telecommunications and television including satellite, broadcast and cable television, there has emerged an increased interest in developing adaptable transmission systems capable of handling a collection of such services. The primary media investigated for providing such services to date comprise, for example, coaxial cable, land-based microwave, so-called cellular radio, broadcast FM, broadcast satellite and optical fiber, to name a few.

Multi-service communications systems may transmit different services over one or more different frequency channels. Each frequency channel may carry more than one service. Therefore, to gain access to a particular service, a receiver must have information to enable it to tune to the frequency channel carrying the desired service and then to select the desired service from the several services provided on that frequency channel. Such information concerning the details of access to a selected service is not pertinent to the subscriber.

U.S. Pat. No. 4,908,859 to Bennett, entitled "Receiver Access Interface to Service Components in Television Channel" discloses a receiver interface system that stores a service definition table, a service-to-channel map, and a channel configuration map. The service definition table defines the relation between service components and service numbers. The service-to-channel map defines the relationship between service numbers and interface channel numbers. The channel configuration may defines the relationship between frequency channels and interface channel numbers. Using these relationships, a receiver can locate and access a service selected by a user in signals transmitted over various frequency channels.

U.S. Pat. No. 5,200,823 to Yoneda et al., entitled "Virtual Channels for a Multiplexed Analog Component (MAC) Television System", contains a description of a television system for providing services, including video, audio, and text services, to remotely located subscribers over a plurality of channels. A decoder at the subscriber location receives audio, video, and text components over each physical channel. The decoder contains a mapping of each physical channel to virtual channel numbers. Each virtual channel may use a different combination of components. For example, one virtual channel may comprise linked pages of text service. A user can select a virtual channel using a selector and thereby receive the combination of service components defined by the virtual channel.

FIGS. 5A and 5B illustrate the operation of a MAC implementation. By way of example, access to the following three services is desired: radio service #1 (RS#1), teletext service #2 (TTX#2), and data service (DS#3). The three services are packaged together to form virtual channel number 1 (VC#1). FIG. 5A provides a pictorial representation of virtual channel number 1. As can be seen, because virtual channel number 1 does not include a video service, the first box is blacked out in this pictorial representation. Information containing the definition for virtual channel number 1 is sent to the decoder every session, a basic unit of timing for the decoder as discussed below. Thus, in each session, the decoder is authorized for the three services defined in virtual channel number 1. FIG. 5B illustrates that virtual channel 1 is authorized by the decoder over eight sessions.

U.S. application Ser. No. 08/027,782, entitled "Apparatus Providing Dynamic Virtual Service Selection in a Multi-Service Communication System," filed Mar. 8, 1993, now U.S. Pat. No. 5,359,601, discloses inter alia a receiver system whereby a plurality of different services may, on a time-varying basis, define a virtual channel. Thus, the virtual channel number may correspond to a first service in a first time period and a second service during a second time period. Accordingly, the system operator may design dynamic virtual service selections from a plurality of basic services. By way of example, the operator may define a "Cowboy Channel" that a subscriber may select using a virtual channel number. By tuning to the virtual channel number, the subscriber may view a cowboy documentary from basic service number 1 between 5:00 PM and 7:00 PM, a cowboy movie from basic service number 30 between 7:00 PM and 9:00 PM, and a western television series from basic service number 3 from 9:00 PM to 11:30 PM.

In the foregoing systems, a single service is typically defined for each virtual channel. Therefore, a problem arises when a subscriber wants to simultaneously view or access more than one service. For example, a subscriber may wish to view a television service and at the same time access a data service, or read from a teletext service while listening to a radio service. The systems described above only access or authorize one virtual channel at a given time. The aforementioned problem cannot be solved simply by packaging two services together in one virtual channel because some subscribers may not wish to access both services and thus will be unwilling to pay for the extra service.

One solution to the problem of providing simultaneous access to a plurality of services is to define additional virtual channels for each possible combination of services. By selecting the appropriate virtual channel, the subscriber can access the desired combination of services. If another subscriber does not want a particular service, that subscriber will not be authorized to receive it. However, this solution is problematic because only a finite number of virtual channels are available. As the number of available services increases, the number of combinations of services rapidly increases thereby exceeding the number of available virtual channels. Limited by the number of virtual channels available, the operator may be required to reduce the number of individual services provided. This results in fewer choices for the subscriber and reduced flexibility. Thus, defining virtual channels in this manner is wasteful, particularly if channels can be used for other services.

II. SUMMARY OF THE INVENTION

It is an object of the present invention to provide a flexible system and method for providing a wide range of services to subscribers of a multiservice communication system without the necessity of providing an excessive number of virtual channels.

It is a further object of the invention to provide a decoder that is capable of authorizing a plurality of virtual channels simultaneously.

It is a further object of the invention to provide an improved method for authorizing virtual channels so that subscribers to a multiservice communication system are offered a broad range of services and combinations of services.

It is a further object of the present invention to provide an improved method for authorizing virtual channels that simplifies management at the encoder.

The above objects and other are achieved by the present invention in which a decoder is provided that is capable of authorizing more than one virtual channel at a given time thereby making multiple streams of data available to a subscriber. As referred to herein, a stream is a basic component of a service. For example, a video stream is used to create the video picture that appears on a television screen. An audio stream is used by a speaker, for example, to generate sound or by other audio hardware for processing. A teletext stream may be used to generate text or graphics information for display on a television or other screen. A data stream may be output from a serial port of the decoder to, for example, a computer. A plurality of digital service data streams at various rates may be multiplexed and transmitted from an origination point to a plurality of remote locations.

Streams may be combined together to form services. A television service, for example, may be comprised of a video stream and an audio stream. A radio service, such as a classical music service, may be comprised only of an audio stream. Thus, a digital service may comprise a collection from any of a number of low data rate, medium data rate and high data rate services including, but not limited to, video (both standard and high resolution), audio (from monaural to "surround-sound"), text, and data (from subscription software to video games to high speed data-base exchanges).

Services are assigned to virtual channels. By selecting a certain virtual channel number using a decoder, the subscriber can access a particular service defined for the selected virtual channel. As noted above, each unique service is defined by a virtual channel according to the present invention. Multiple virtual channels can be selected using the decoder thereby permitting access to multiple services. Thus, unlike in the prior art systems, more than one virtual channel can be authorized at a given time.

In the present invention, the decoder may simultaneously authorize as many virtual channels as required to provide the desired combination of services. Accordingly, the subscriber enjoys maximum flexibility and an increased number of choices when deciding which services to view or access. Furthermore, it is not necessary for the encoder to package different services together in various combinations. Each virtual channel only needs to contain a single service. This simplifies the task of managing the virtual channels and does not result in an excessive number of virtual channels being defined.

The present invention is described primarily in the context of a pay television system such as a cable television or direct broadcast satellite system (DBS), that typically distribute a variety of program services to subscribers for presentation on home terminal equipment which is the property of the end user or subscriber to the pay services. Such home terminal equipment may comprise video game apparatus, a television signal receiver (either standard or high definition), a home computer, a printer (either a facsimile or high resolution image printer), a stereo sound system, a telephone (including portable, mobile or stationary), a picture-phone, an energy system or alarm equipment interface, or any other known such apparatus or combination of apparatus. The present invention is also envisioned to be used in a telecommunications environment or other fixed or switched one-way or two-way program apparatus.

III. DETAILED DESCRIPTION

Brief Description of the Drawings

A more complete appreciation of the present invention and many of the attendant advantages thereof will be readily obtained as the invention becomes better understood by reference to the following detailed description when considered in connection with the accompanying drawings.

FIG. 4 illustrates an example of the data format for a virtual channel packet according to the present invention.

FIGS. 6A–6B provide a pictorial representation of how a plurality of virtual channels are authorized simultaneously over a plurality of session according to the present invention.

FIG. 9 illustrates one preferred of a Stream Authorization Table (SAT) stored in the decoder.

FIG. 10A illustrates how the SAT is updated when a single virtual channel is selected.

FIGS. 10B–10C illustrate how the SAT is updated when multiple virtual channels are selected.

FIGS. 11A–11B illustrate how the SAT is updated when a user selects a virtual channel to replace another virtual channel.

Detailed Description of the Drawings

Figure 1:
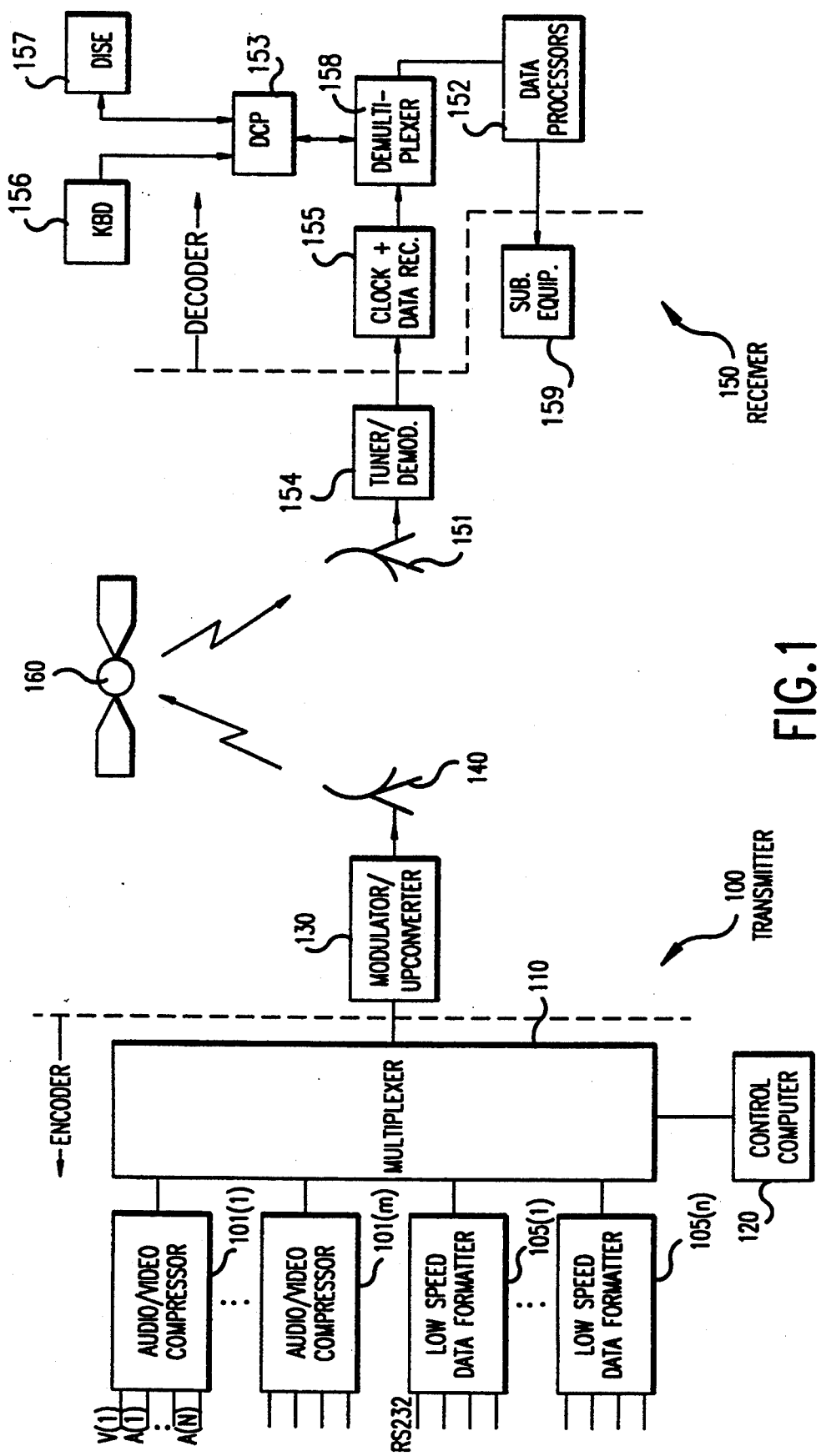
FIG. 1 is a system block diagram showing a transmitter site 100 including an encoder and a receiver site 150 including a decoder according to the present invention for transmitting low data rate, medium data rate (audio) and high data rate (video) data implemented in a satellite communications system.

FIG. 1 shows a transmitter site 100 including an encoder and a receiver site 150 including a decoder according to the present invention applied in the environment of a satellite communications system. Audio/video compressor circuits 101(1) to 101(m) are shown for individually receiving streams of audio data and/or streams of video data, for example, from a plurality of programmers providing such services. One such MPEG video compressor known in the art is a National Transcommunications, Ltd. (England) NTL 2000 V compressor. Similarly, a plurality of low data rate streams, for example, RS232 digital data, are received at low speed data formatters 105(1) to 105(n). The audio video compressors compress the received medium and high data rate data in accordance with known algorithms (for example, in accordance with currently known or proposed standards such as MPEG I or II, audio or video, in particular, for example, ISO 11171 or ISO 13818).

Control computer 120 supplies control information, preferably as data packets, to the multiplexer 110. For example, the data packets may be constructed by the control computer according to specified formats responsive to the entry of appropriate instructions into control computer 120. Such control information includes information, for example formatted as a packet, corresponding to the service provided for each virtual channel. Such a packet will be referred to herein as a virtual channel packet. Each unique service defines a virtual channel. Thus, it is not necessary to package multiple services into a single virtual channel, and the number of virtual channels that need to be defined corresponds to the number of unique services available. The specific information required by the decoder to implement authorization modes and the data structure by which this information can be transmitted is discussed in greater detail in U.S. patent application Ser. No. 08/160,830, entitled "System and Method for Transmitting and Receiving Variable Length Authorization Control For Digital Services", filed Dec. 3, 1993, and incorporated by reference.

In addition, control computer 120 controls multiplexer 110 to time division multiplex the compressed medium and high data rate streams output from compressors 101(1) to 101(m) and the low data rate streams output from formatters 105(1) to 105(n) into a serial data stream for output to modulator 130. The high speed data link connecting multiplexer 110 and modulator 130 may be coaxial cable, optical fiber or twisted pair, so long as the transmission is relatively noise free and at sufficient data rate. In a preferred, but nonetheless non-limiting, embodiment the control information and the data streams are encrypted. Modulator 130 then modulates the multiplexed digital data stream on to a carrier and up converts the carrier as necessary for transmission via, for example, C or Ku band frequencies through a satellite antenna 140. Modulator 130 may preferably comprise a quadrature phase shift key modulator known in the art for satellite transmission. Satellite antenna 140 beams a signal including the modulated data to satellite 160 which may be functionally referred to as a transponder. Transponder 160 simply repeats the received signal toward earth and satellite receiver antenna 151.

Receiver site 150 typically includes a tuner/demodulator 154 for selecting one of a plurality of channels to which satellite tuner/demodulator 154 may be tuned. Tuner/demodulator 154 down converts and outputs a demodulated data stream to clock and data recovery circuit 155. Clock and data recovery circuit 155 in turn outputs an error corrected data stream and synchronization data to demultiplexer 158. Additional details concerning a suitable clock and data receovery circuit may be obtained from U.S. patent Ser. No. 08/160,839, entitled "Method and Apparatus for Locating and Tracking a QPSK Carrier", filed Dec. 3, 1993, and incorporated herein by reference.

A user may select one or more virtual channels by inputting virtual channel number(s) via a selector according to any known means, e.g. remote control or using push buttons on a panel thereof. The selector will hereinafter be referred to as KBD 156. The virtual channel selection may be facilitated by a menu page provided for the user so that the decoder can distinguish between the case where two or more virtual channels are authorized simultaneously and the case where one virtual channel is selected to replace another.

The virtual channel selection information is sent to display control processor (DCP) 153, which controls all aspects of the decoders operation. Under the control of DCP 153, the demultiplexer 158 extracts control information corresponding to one selected virtual channel from the received data each session. As above, this control information may be the virtual channel packet. If more than one virtual channel is selected, control information corresponding to another selected virtual channel is extracted the next session. Details concerning multiple virtual channel selection and sessions are provided below.

The DCP 153 then reads the virtual channel packet out of the demultiplexer 158. The virtual channel packet may be encrypted as discussed above and may include authorization information. Accordingly, the DCP 153 supplies the encrypted virtual channel packet to digital compression in-board security element (DISE) 157. DISE 157 decrypts the virtual channel packet and determines whether the decoder is authorized to receive the channel identified in the control information. If so, the DISE 157 supplies to the demultiplexer 158 via DCP 153 access information to enable the demultiplexer 158 to output the appropriate data streams. The access information may include decryption information for decrypting the data corresponding to the selected channel and information concerning the location of the selected channel data in the multiplexed data. The information concerning the location of the selected channel data in the multiplexed data may comprise a data packet identifying the separate data streams that form the service defining the selected virtual channel. The information for decrypting the data streams corresponding to the selected virtual channel may comprise decryption seeds such as those discussed in U.S. patent application Ser. No. 08/101,974, entitled "Method and Apparatus for Uniquely Encrypting a Plurality of Services at a Transmission Site", filed Aug. 4, 1993, now U.S. Pat. No. 5,237,610, and incorporated herein by reference.

DISE 157 preferably comprises a secure microprocessor including on-board read only memory (ROM) and random access memory (RAM). One such secure microprocessor may be a Motorola MC68HC05SC27. Alternatively, one may use a Motorola MC68HC05SC21, which is referred to in U.S. patent application Ser. No. 08/101,974, entitled "Method and Apparatus for Uniquely Encrypting a Plurality of Services at a Transmission Site", incorporated herein by reference. Certain other security elements are discussed in U.S. Pat. No. 5,029,207 and U.S. Pat. No. 5,237,610, both incorporated herein by reference.

The demultiplexer 158, responsive to the access information output by DISE 157, may locate, demultiplex (i.e., extract), and decrypt the data streams corresponding to the selected virtual channel for that session and then provides the demultiplexed data streams to various output ports to subscriber equipment 159 via peripheral data processors 152. In a preferred embodiment, the demultiplexer is an application specific integrated circuit (ASIC). Further details concerning the operation of the demultiplexer 158 and the peripheral data processors 152 may be obtained from U.S. patent application Ser. No. 08/161,159, entitled "A Multi-Service Data Receiver Architecture", filed Dec. 3, 1993, and which is incorporated herein by reference. In addition, further details concerning encryption and decryption, among other things, may be found in U.S. patent application Ser. No. 08/101,974, entitled "Method and Apparatus for Uniquely Encrypting a Plurality of Services as a Transmission Site", which is incorporated herein by reference.

The user or subscriber equipment may comprise, for example, standard or high definition television reception equipment, digital audio reception equipment, digital data processors or computers, video game equipment, facsimile receiver/printers, energy management equipment and the like.

The receiver site 150 may not only be a subscriber to services but may be a provider of services such as a cable television system operator. In such a scenario, the receiver site 150 may not include typical subscriber equipment 159 but may include cable television system headend equipment known in the art including television modulators and digital audio service providing equipment and the like.

Figure 2A:
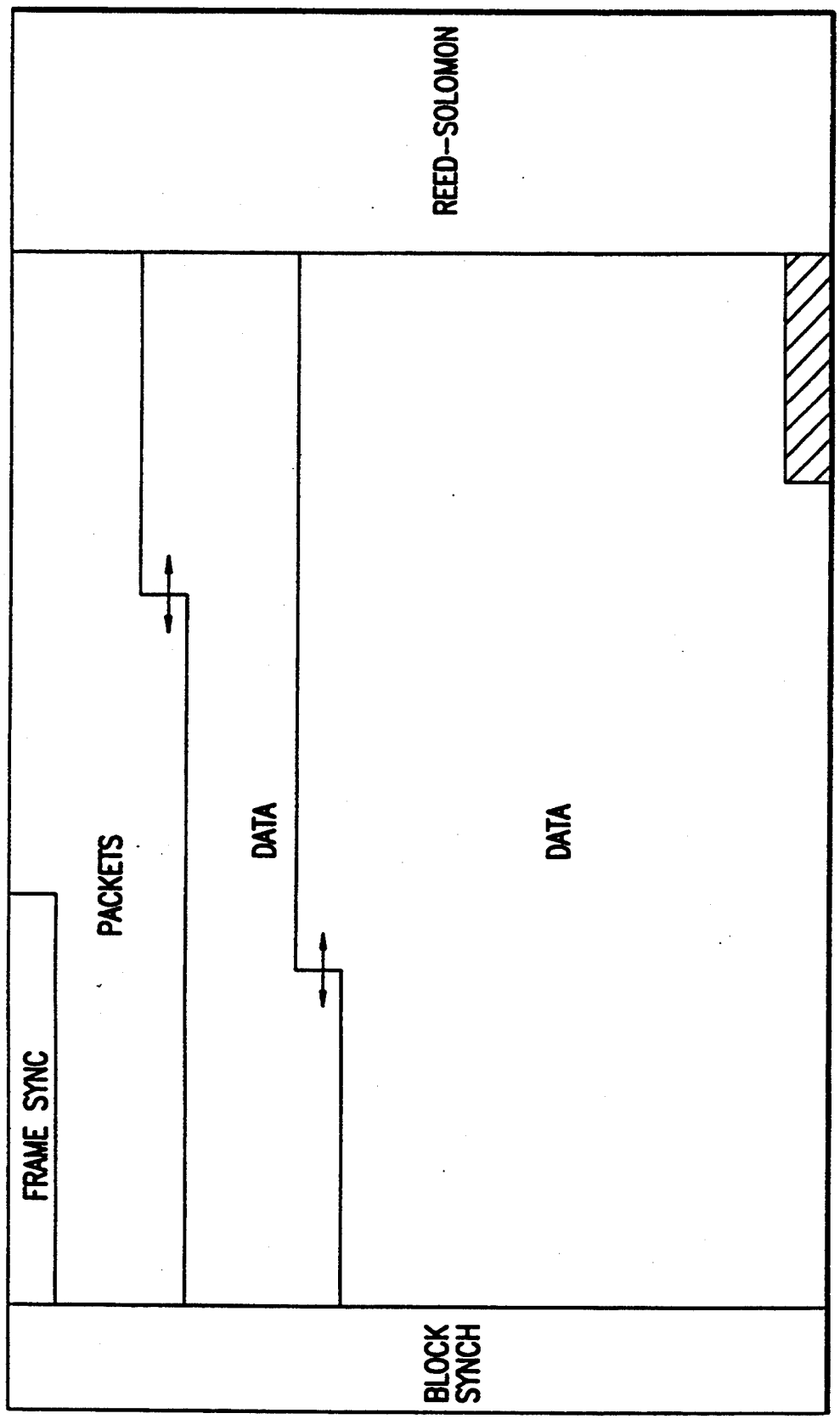
FIG. 2A is a diagram showing a scalable multiplex frame, including synchronization words BLOCK SYNCH (also referred to herein as HSYNCH) and FRAME SYNCH, for transmitting a digital data stream of low data rate (included within PACKETS), medium data rate (audio) and high data rate (video) data protected by Reed-Solomon encoding according to the present invention.

Referring now to FIG. 2A, there is shown a generic frame having highly flexible characteristics that may be used in connection with the present invention. However, it will be recognized that the present invention may be practiced in connection with other data frame structures, whether they are more flexible or less flexible than that described below, without significantly diminishing the advantages of the present invention. The static or fixed elements of the depicted scalable multiplex according to the present invention are BLOCK SYNCH (or HSYNCH) and FRAME SYNC. All other depicted elements of the frame are flexible and may change from medium to medium and from frame to frame. For example, Reed-Solomon error correction parity data may be provided for satellite transmission and omitted for less error prone forms of media.

PACKETS data comprises control information, including authorization control information, as well as low speed data services. Moreover, the delineation between what is shown as PACKETS data and areas for medium speed (audio) and high speed (video) data portions are flexible, and the figure is not intended to show that the boundaries between such forms of data is fixed at any one point in the frame. A predetermined structure is provided to the frame in that FRAME SYNCH follows the first byte of HSYNCH in a frame according to the present invention. PACKETS data follows FRAME SYNCH, followed in turn by medium speed (audio) and high speed (video) data in that order. There will always be some PACKETS data for control purposes but depending on the priorities of data services to be transmitted there may not exist low speed data portions thereof, medium speed data sections or high speed data sections of a particular frame. A more detailed discussion of the data frame structure is found in U.S. patent application Ser. No. 08/161,160, entitled "System and Method for Transmitting a Plurality of Digital Services Including Imaging Services," filed concurrently herewith and which is incorporated herein by reference. Further details concerning HSYNCH and FRAME SYNCH determination and recovery at a receiver may be found in U.S. application Ser. No. 08/160,841, entitled "Memory Efficient Method and Apparatus for Synch Detection," filed Dec. 3, 1993, and incorporated herein by reference.

The term PACKETS is intended to refer to a collection of, for example, control or system data blocks which are intended to signal or control a receiver to, for example, identify the data types or data services and the respective data beginning and ending boundaries to follow. The control data blocks may serve to limit the variety of services available to an end user as well as provide a basis upon which the end user may control his receiver to receive and output data services as he chooses. In other words, according to some applications, the user's selection of services may be limited by their on-hand equipment and their preferences to particular ones of the authorized services in particular arrangements of the various multiplexed data streams or blocks that follow in the data stream.

Low speed data refers to teletext, facsimile, conditional access, alarm, energy management, certain audio and other data streams which typically exhibit data rates of less than sixty-four kilobytes per second. Medium speed data refers to more sophisticated forms of audio such as "surround-sound" and medium speed data rates between, for example, 64 kilobytes per second and T1 carrier or D1 (telecommunications) rates of approximately one megabit per second. High speed data refers to some compressed forms of video transmission up to data rates required for high definition color television, be it in a MUSE, European, so-called Grand Alliance proposed U.S. format or other HDTV format. Such a structure is not intended to be fixed; for example, the present suggested data rates may be broken into only two regions of low and high speed data. Nevertheless, for example, low speed data will always be included within PACKETS data and precede higher speed data sections of the frame, and high speed data will always follow slower speed data and precede the first HSYNCH and FRAME SYNCH words for the next frame.

The size of a particular frame is dictated by the transmission medium and the data to be carried. One of the features of the present invention is a minimization of the number of bytes utilized for authorization of services and a maximization of the payload or information data portions of the frame. Thus, transmitter power and signal to noise objectives are achieved along with information payload maximization. Then, large frames are inherently more efficient, and there is an improved tolerance of long burst errors, for example, in a cable or satellite environment. Other factors weigh against the choice of too large a frame. These include the speed of achieving synchronization at a receiver and the cost of error correction circuitry such as memory costs at a receiver site.

In an error-prone environment, error protection is provided by a Reed-Solomon block code denoted REED-SOLOMON and appearing in FIG. 2A as a narrow but long rectangular column at the right of the figure. As is shown in either FIG. 2A or 2B, the Reed-Solomon block code is appended to the information data bytes as forward error correction (FEC) parity bytes. The proportion of FEC bytes to information bytes is on the order of from one to ten per cent depending on the particular medium or mixture of media or application. Interleaving, wherein bytes of a number of blocks grouped in the depicted frame are shuffled between blocks according to a predetermined algorithm known to transmitter and receiver alike, may be employed to provide additional protection against extended bursts of errors. Further information concerning interleaving may be found in U.S. patent application Ser. No. 08/161,160, entitled "System and Method for Transmitting a Plurality of Digital Services Including Imaging Services," filed Dec. 3, 1993, and which is incorporated herein by reference.

A nearly square, but not perfectly square, frame is preferred and thus the practical maximum limit on the vertical dimension is about 512 lines or blocks. In keeping with such considerations and practical limitations on typical media bandwidths, a practical maximum number of video services is on the order of thirty-two and on concurrent audio services, sixty-four, assuming video and audio data compression is utilized without greatly sacrificing received signal resolution.

Figure 2B:
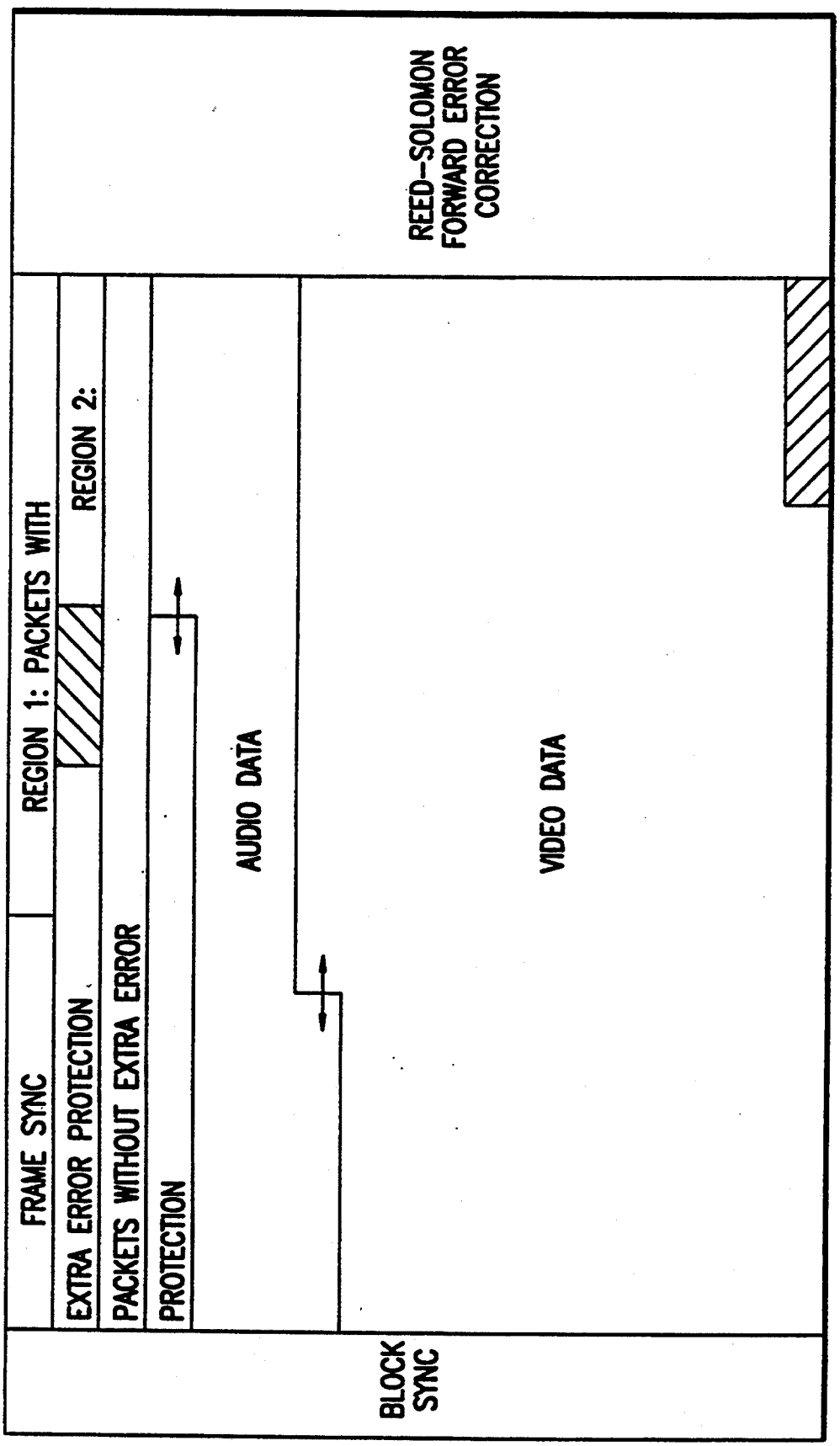
FIG. 2B is a second diagram of the frame of FIG. 2A wherein the PACKETS area is further broken down into first and second regions, the first region including packets with extra error protection and the second region including data protected only by Reed-Solomon encoding.

PACKETS data follows the FRAME SYNC word in the frame. Certain PACKETS data is utilized to identify the number of bytes provided in a frame for a particular service when byte stuffing is required. Referring to FIG. 2B, the PACKETS data portion of the multiplex frame may be said to further consist of two regions: one region including a MUX Structure Control packet requiring additional forward error correction and a second region requiring now additional forward error correction than the Reed-Solomon coding provided for each row or line (excluding HSYNCH).

Other categories of PACKETS data do not require additional forward error correction. These include video and audio control, seed packets for decryption, cyclic system data, composite virtual channel and definition packets for providing what may be perceived as additional data services, addressed data packets for transmitting messages to addressed decoders, text and utility data packets and other service packets. Additional details of the various PACKETS data may be obtained from U.S. patent application No. 08/161,160, entitled "System and Method for Transmitting a Plurality of Digital Services Including Imaging Services," filed Dec. 3, 1993 and which is incorporated herein by reference.

Figure 2C:
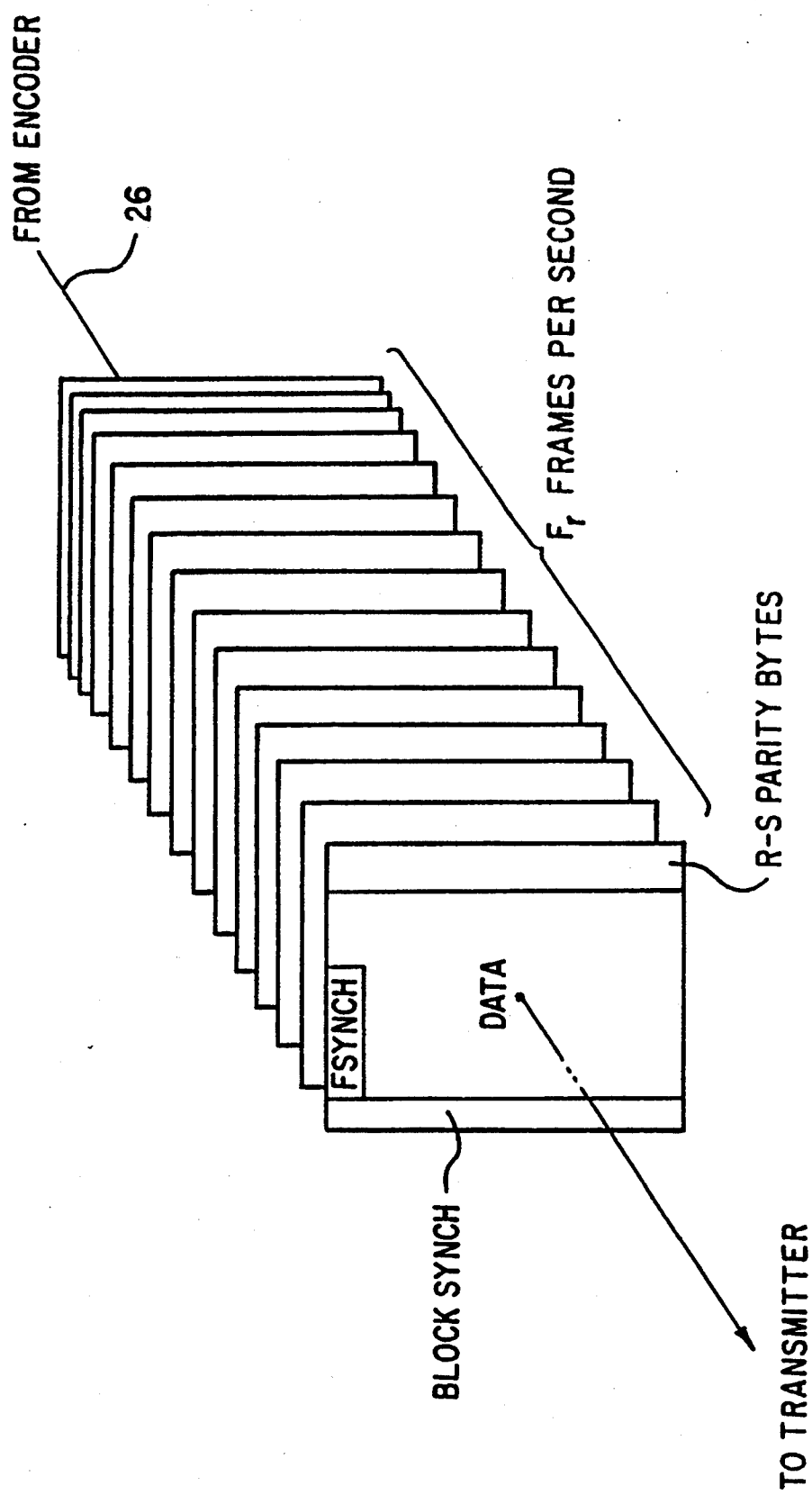
FIG. 2C is a diagram showing that a sequence of frames in the form of FIGS. 2A or 2B are transmitted to a receiver according to the present invention.

FIG. 2C illustrates that a sequence of frames in the form of FIGS. 2A or 2B are transmitted to a receiver according to the present invention. The sequence of frames need not be composed of identical allocation of packets, low speed data, etc. Rather, the content of individual frames may altered by the operator in accordance with the services and authorization control desired.

The sequence of frames is divided into "sessions." A "session" defines the number of frames for which an authorization sequence is valid. The frames are transmitted at a fixed rate, e.g., every 20 msec. Accordingly, a session may also be considered a basic unit of time for the decoder. Because it defines the number of frames for which an authorization sequence is valid, a session is a software requirement, and hardware support is added to enable a session to be implemented. According to one preferred embodiment of the present invention, a session may comprise 13 frames and have a duration of about 0.25 sec. However, this should not be considered to limit the present invention. A session may be selected to ensure enough time to decrypt all conditional access data, but not too long to delay authorization. In one preferred embodiment, video and audio will not start until the first session after decryption seeds have been calculated and stored in the demultiplexer 158.

System hardware maintains a session count for software reference. When the session count is zero, the decryptors are re-initialized. The session counter may be variable (e.g. 0 to 63) so that the session length may be increased or decreased depending on how long the DISE requires to calculate authorization. In addition, seeds for all encryptors are maintained over multiple data frames.

All of the data required for authorization may distributed over the course of a session. In other words, the decoder must extract from the multiplex the information it needs to generate the virtual channel(s) selected. Otherwise, the decoder will not be able to demultiplex the data streams corresponding to the selected virtual channel or generate the necessary decryption seeds to decrypt such data streams. For example, global seed may be placed in frame 1, global system data may be placed in frame 2, virtual channel packets may be placed in any of frames 0-3, and addressed data packets (ADPs) may be placed in any frame. Of course, this is intended merely as an example and should not be considered limiting. For example, any placement that is efficient for the DISE may be implemented. In one preferred embodiment, only one virtual channel packet is sent per session for each virtual channel.

Figure 3:
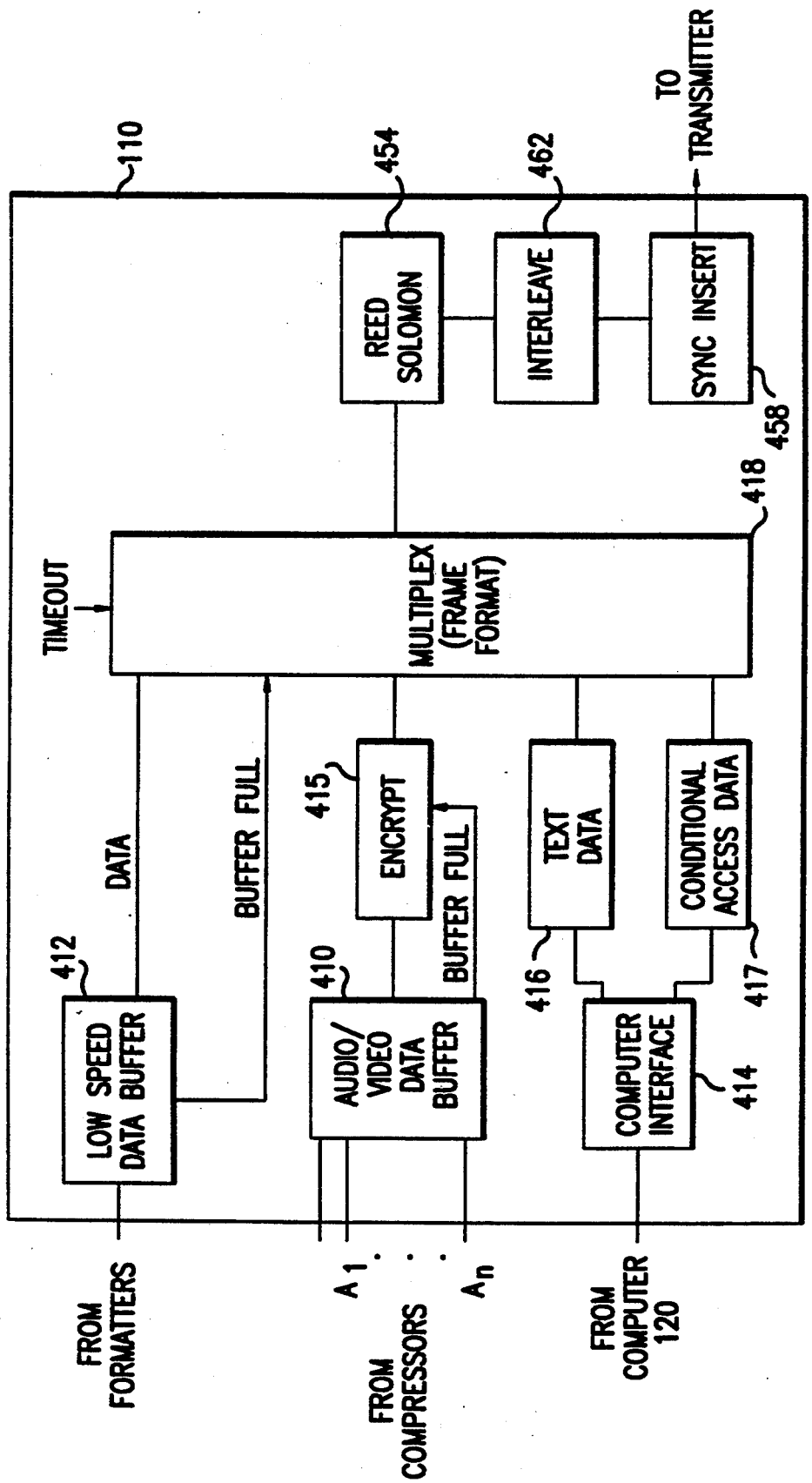
FIG. 3 is a detailed schematic block diagram of a multiplexer 110 of FIG. 1 according to the present invention for outputting multiplexed data according to the multiplex frame format of FIGS. 2A, 2B and 2C.

Now, the multiplexer 110 of FIG. 1 will be described in further detail with reference to FIG. 3. Audio/video service streams A1 to An are received from audio/v- ideo compressors at audio/video data buffer 410. Service multiplexer 110 operates to multiplex a plurality of digital service streams for transmission to remote locations. Also shown are inputs to a low speed data buffer 412 from low speed data formatters 105(1) to 105(n). Buffer 410 (audio/video) and buffer 412 for low speed data preferably signal a buffer fullness condition to the next functional element, for example, encryption block 415, if encryption is desired, or on to multiplex frame formatter 418 for low speed data. Encryption block 415 is intended to represent the inclusion of, for example, single or double tiers of encryption in accordance with seeds and keys and particular, predetermined algorithms as required for the digital service streams, for example, in a pay environment.

Other digital data is input from a text/graphics input computer, for example, teletext data to text data processor 416 via computer interface 414 to the service multiplexer 418. Conditional access data, including addressed data packets, global seed and virtual channel packets (or seed packets and composite virtual channel packets), is input, for example, from a billing computer or subscriber service computer for storage in conditional access data buffer 417. Conditional access data typically defines the services, especially pay services, to which a subscriber has subscribed. This data interfaced also via interface 414 is processed and packeted into protect region 1 PACKETS via conditional access data processing block 417 for input to multiplex formatter 418.

Thus, at the output of multiplex (MUX) block 418 is a multiplexed frame structure as described by FIGS. 2A, 2B and 2C. The output digital stream is Reed Solomon encoded according to an appropriate encoding scheme depending on the noise characteristics of the transmission media by a well known Reed Solomon encoder 454. Then, preferably in a highly noisy environment, the frame is interleaved on a byte(s) (rows and columns switching) basis at interleave block 462. Interleave circuit 462 interleaves the data frame by transposing row and column addresses of data within the frame. Lastly, HSYNCH and FRAME SYNCH are inserted into the frame just prior to transmission at synch insert block 458. This data then appears at a receiver at its original location in the frame while all other data is interleaved.

As should be clear from the above description, the multiplexed data signal is an amalgamation of video, audio, and authorization data. A typical multiplexed data signal may carry, for example, a maximum of 32 video data streams and 64 audio data streams. Each of the data streams may be encrypted with a unique encryption seed. Therefore, the decoder must extract the required video/audio/utility data stream(s) from the multiplexed signal and decrypt them properly in order to enable a particular service/virtual channel to be accessed.

A virtual channel packet is preferably transmitted in the multiplex to identify which data streams belong to which virtual channels. Virtual channel packets are encrypted packets that identify which streams are used to form the service/virtual channel. The virtual channel packet preferable comprises fields identifying the virtual channel number and the locations of various streams composing the virtual channel. FIG. 4 provides an example. Among the fields provided, VIRTUAL CHANNEL NUMBER identifies the virtual channel corresponding to the virtual channel packet. The physical video, physical audio, physical utility, and physical text fields identify the location in the multiplex where the streams forming the virtual channel are located. For example, the location in the multiplex may be identified using a number for each type of stream. Accordingly, physical video channel #1 may specify a number between 0 and 31, for example, 12. The decoder would thus determine that the virtual channel includes video stream number 12 and would extract video stream number 12 from the multiplex.

Only one virtual channel packet is transmitted for each virtual channel per session. However, each virtual channel packet contains the information the decoder requires to generate all of the seeds required to decrypt the data streams forming the corresponding service. This information may be coincident with the number identifying the stream(s) forming the virtual channel. Each virtual channel packet specifies one virtual channel. In each session, the transmitter transmits virtual channel packets for all possible virtual channels. Thus, if there are ten virtual channels, the transmitter must transmit ten different virtual channel packets, one for each virtual channel.

Figure 5A:
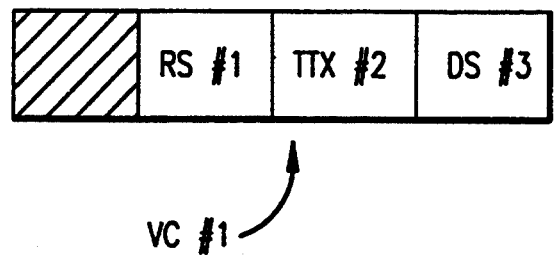
FIGS. 5A–5B provide a pictorial representation of how a single virtual channel is authorized over a plurality of sessions in a prior art system.
Figure 5B:
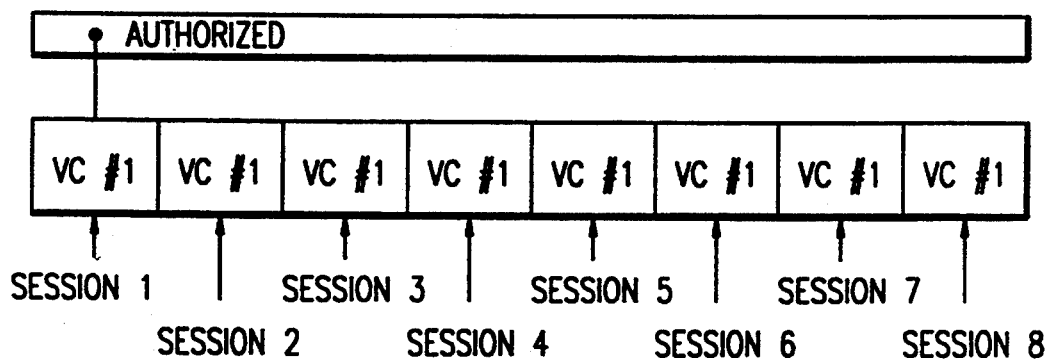
Figure 6B:
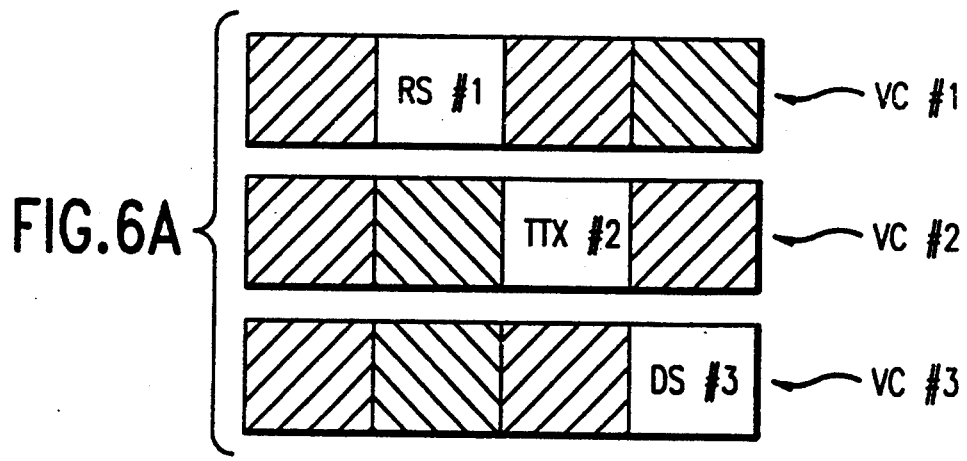
Figure 6B:
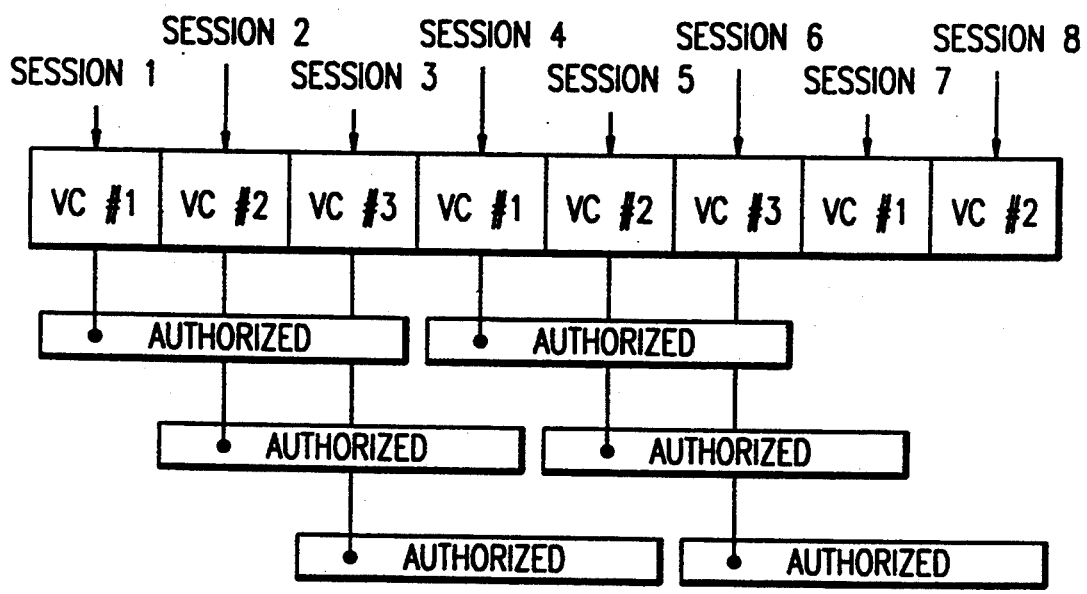

Additional aspects of the present invention will be discussed with reference to FIGS. 6A and 6B. In the present invention, a virtual channel is defined for each service as illustrated in FIGS. 6A. Following the example of FIGS. 5A and 5B, FIG. 6A illustrates that access to the following three services is desired: radio service #1 (RS#1), teletext service #2 (TTX#2), and data service (DS#3). A virtual channel is defined for each service: VC#1 is composed of RS#1; VC#2 is composed of TTX#2; and VC#3 is composed of DS#3.

Multiple services can be accessed by selecting multiple virtual channels. Thus, the present invention provides the user with an increased number of choices when deciding which services to access. The user can access all types of service in any quantity and in any combination. To access two services, the decoder only requires information concerning which two virtual channels are selected. This may be done via KBD 156. As illustrated in FIG. 6A, the user would have entered into the DCP, using a keyboard, a remote control, or other known selector means, the virtual channel numbers 1, 2, and 3. As discussed above, the system operator may provide a menu to assist the user in making the selection and to avoid confusion between entry of multiple virtual channels for simultaneous access and a virtual channel change. Of course, other means may be employed to preserve this distinction.

The decoder grabs the virtual channel packet corresponding to a virtual channel selected by the user. In each session, there can be multiple services transmitted in a single frame, and several sequences of frames may be transmitted on different frequencies, or different physical channels. Therefore, the decoder must tune to the physical channel that corresponds to the virtual channel packet to be grabbed that session.

The decoder only processes one virtual channel packet per session. In order to receive two virtual channels simultaneously, the tuner tunes to a first virtual channel for a first session and a second virtual channel for a second session. For succeeding sessions, the tuner would alternate between the two physical channels. When the tuner is tuned to one virtual channel, the decoder maintains authorization, including access information, for the previous virtual channel, even though virtual channel packets were not processed for the previous virtual channels during that session.

In particular, the DISE 157 may maintain which virtual channels are authorized and the locations of the data streams that make up those virtual channels in a table in RAM. Details concerning the table and its use are provided below. Using the table, the DISE 157 can output the appropriate location information and decryption information to the DCP 153 for supply to the demultiplexer 158. The demultiplexer 158 may then extract and decrypt the data streams corresponding to these virtual channels. Consequently, the decoder will output service data corresponding to each selected virtual channel even though a virtual channel packet associated with one or more selected virtual channels was not processed that session.

For example, assume that the decoder is tuned to a virtual channel that has video and audio streams in a first session. In a second session, the decoder is tuned to a virtual channel that has a data stream only. During the second session when the decoder is tuned to the second virtual channel, decryption seeds and location information will be generated for all three streams—video, audio, and data. The demultiplexer 158 will extract each of these streams from the received multiplex and decrypt them using the decryption seeds. Accordingly, both virtual channels may be accessed simultaneously. The video and audio may be displayed on a television monitor while the data stream may be output to a peripheral device via a data output port.

FIG. 6B illustrates decoder authorization for the case where three virtual channels are selected for simultaneous access. Because the decoder can only process one virtual channel packet per session, VC#1 is received the first session, the fourth session, etc., VC#2 is received the second session, the fifth session, etc., and VC#3 is received the third session, the sixth session, etc. From the virtual channel packets processed for the respective virtual channels, the DISE supplies the demultiplexer with the information it needs to locate and decrypt the data streams that form the services defining each virtual channel.

The DISE maintains authorization information, including access information, for the virtual channels received in the previous sessions. Thus, in session 2, the DISE grabs the virtual channel packet corresponding to VC#2. It also maintains in memory that VC#1 was authorized in the previous session. Accordingly, the DISE outputs location information and decryption seeds for both of VC#1 and VC#2 to the demultiplexer which can then extract and decrypt the appropriate data streams. Therefore, both VC#1 and VC#2 are authorized, and RS#1 and TTX#2 may both be accessed.

Furthermore, in session 3, the decoder grabs the virtual channel packet corresponding to VC#3. The decoder maintains in memory the authorization information for the virtual channels received in the previous sessions, namely RS#1 and TTX#2. The DISE will output location information and decryption seeds for each of VC#1, VC#2, and VC#3 to the demultiplexer for extraction and decryption. Thus, all three services RS#1, TTX#2, and DS#3 will be authorized and will be capable of being accessed. The cycle begins again in session 4 in which the decoder grabs the virtual channel packet corresponding to VC#1.

Figure 7:
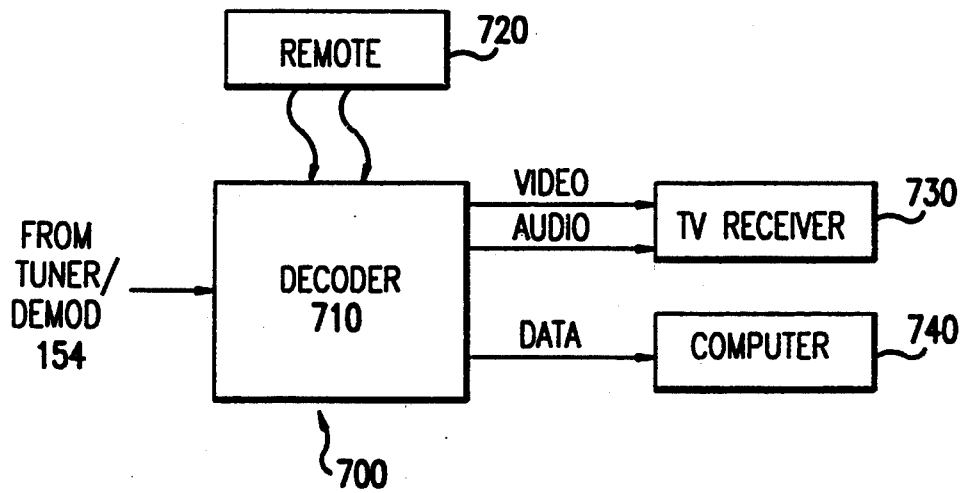
FIG. 7 illustrates a decoder system according to the present invention that outputs video and audio signals to a television receiver and data to a computer.

FIG. 7 illustrates a decoder system 700 that supports a single video/audio output and a single data output. The decoder 710 receives data from tuner/demodulator 154, shown in FIG. 1. A remote control 720 may be provided to select one or more virtual channels. Responsive to the remote control 720, the decoder 710 may output video and audio signals corresponding to a first selected virtual channel to television receiver 730 and may output data corresponding to a second selected virtual channel to a computer 740. Alternatively, data may be output to a memory device, for example, and video and audio signals may be output, for example, to a video recorder.

Figure 8:
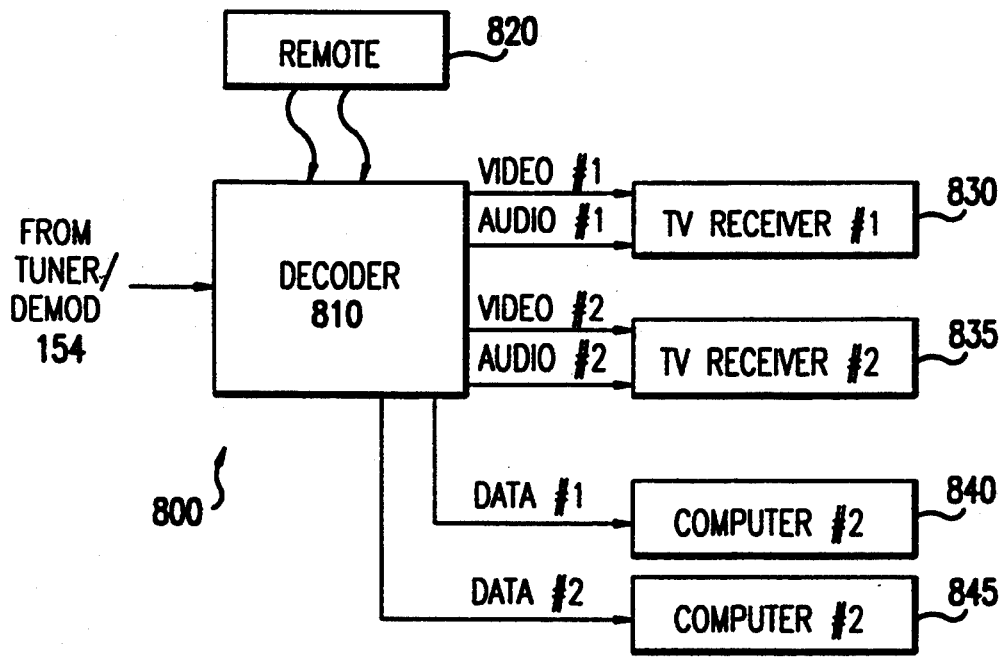
FIG. 8 illustrates a decoder system according to the present invention that outputs video and audio signals to first and second television receivers and outputs data to first and second computers.

FIG. 8 illustrates a decoder system 800 that supports two different video/audio outputs and two different data outputs. In such a decoder system, it would be possible to watch two different TV channels and access two different data services at the same time. The decoder 810 receives data from tuner/demodulator 154. Responsive to the selection of one or more virtual channels via remote control 820, the decoder 810 may supply first video and audio signals to a first television receiver 830 and second video and audio signals to a second television receiver 835. In addition, first and second data signals may be output to computers 840 and 845, respectively.

In one preferred embodiment, the decoder system is capable of simultaneously authorizing six virtual channels. This is done in a manner similar to that for authorizing two channels simultaneously. Accordingly, the decoder can locate and decrypt two video streams, two audio streams, a stream of utility data, and a teletext stream in any one session, provided that each stream defines a virtual channel. Of course, by extension, a decoder may be provided that simultaneously authorizes any number of virtual channels.

One preferred embodiment for maintaining authorization information in a RAM table in the DISE 157 will now be discussed. When the DISE 157 receives a virtual channel packet grabbed from the multiplexed signal, it determines whether the virtual channel is authorized for access by the subscriber. The DISE may determine authorization in various ways which will not be discussed herein. If the DISE determines that the virtual channel is authorized, it will then copy access information obtained from the grabbed virtual channel packet into a RAM table referred to herein as a Stream Authorization Table (SAT). The SAT is used to keep track of each virtual channel that is currently authorized, and which streams are used to form the authorized virtual channels. From this information, the DISE 157 may provide the demultiplexer with location information and decryption seeds for authorized virtual channels even if a corresponding virtual channel packet was not processed that session.

An example of a SAT is shown in FIG. 9. As shown, the SAT has six columns holding six stream types: two video streams (V1, V2); two audio streams (A1, A2); a utility data stream (U); and a text stream (T). The SAT has two rows, one for stream number and one for virtual channel number. Of course, the various fields shown in FIG. 9 should not be considered limiting. The SAT may include any fields providing useful information for the DISE or for the DISE to provide to other components.

The DISE copies the fields from the received virtual channel packet into the SAT if the virtual channel is authorized. For example, the SAT depicted in FIG. 10A indicates that virtual channel number 1 includes video stream #3 and audio stream #5. Entries for unused streams are zero.

FIG. 10B illustrates the example of a SAT when multiple services are authorized. When the DISE subsequently receives a virtual channel packet defining a utility service, the access information in the received virtual channel packet is copied into the SAT without disturbing the currently held contents. The SAT would therefore indicate that virtual channel number 1 includes video stream #3 and audio stream #5 and that virtual channel number 4 includes utility stream #4. Accordingly, the SAT is updated each time a virtual channel packet is received by the DISE. When two virtual channels are selected, the DISE alternates for each session between updating the SAT with information from a first virtual channel packet and information from a second virtual channel packet.

FIG. 10C illustrates the example when a third virtual channel packet corresponding to virtual channel number 9 is received in the third session. Virtual channel number 9 is composed of, for example, video stream #8 and audio stream #4. In this case, the V2 and A2 columns of the SAT are used instead of V1 and A1 to indicate that two video and two audio streams are authorized at the same time. In such a case, a decoder having two video and audio output ports similar to that depicted in FIG. 8 is desirable so that the services can be viewed on two separate screens to avoid interference. As depicted in FIG. 10C, each of virtual channel numbers 1, 4, and 9 are authorized, and the streams that make up the respective virtual channels are identified in the appropriate locations of the SAT. In succeeding sessions, the information for each virtual channel number is updated every third session in the manner described above.

FIGS. 11A and 11b illustrate how a virtual channel may be changed consistent with the examples of FIGS. 9 and 10A-10C. As illustrated in FIG. 11A, the decoder is tuned to virtual channel number 7, which is composed of video stream number 8 and audio stream number 3. Assume that the user now decides to access virtual channel number 6 instead of virtual channel number 7. In such a case, the demultiplexer, under the control of the DCP, will extract the virtual channel packet corresponding to virtual channel number 6 in the following session. The DISE receives that virtual channel packet, determines that it is authorized, and outputs location information and decryption seeds to enable the demultiplexer to extract the streams forming virtual channel number 6 from the multiplex. The DISE also overwrites the information in the SAT with the information obtained from virtual channel packet number 6. As depicted in FIG. 11B, the SAT thus stores that virtual channel number 6 includes video stream #1 and audio stream #2. This information will remain in the SAT for successive sessions as long as the decoder is tuned to virtual channel number 6. When the channel is again changed, new information corresponding to the newly selected virtual channel number is overwritten into the SAT.

While the present invention has been disclosed with respect to a preferred embodiments and modifications thereto, it is to be understood that the invention is not limited to the precise embodiments and that various changes and modifications may be effected therein by those in the art without departing from the scope and spirit of the invention.

We claim:

1. A decoder for use in a multiservice communication system, said decoder comprising:

storing means for storing access information for accessing a service component signal of a first selected virtual channel and a service component signal of a second selected virtual channel from a plurality of service component signals multiplexed in a sequence of frames;

demultiplexing means, responsive to the access information of the storing means, for demultiplexing the service component signal of the first selected virtual channel and for demultiplexing the service component signal of the second selected virtual channel from the plurality of service component signals multiplexed in the sequence of frames; and an output for simultaneously outputting the demultiplexed service component signal of the first selected virtual channel and the demultiplexed service component signal of the second selected virtual channel.

2. A decoder for use in a multiservice communication system, said decoder comprising:

a receiver for receiving service component signals in a sequence of multiplexed frames, wherein the sequence is divided into a plurality of sessions, each session having a plurality of frames;

a selector for selecting first and second virtual channels for simultaneous access, wherein each of the first and second virtual channels corresponds to one or more service component signals in the sequence of multiplexed frames;

extracting means, responsive to said selector, for extracting from the received frames in alternate sessions first control information identifying service component signals of the first selected virtual channel and second control information identifying service component signals of the second selected virtual channel;

a security element for receiving the extracted first control information and the extracted second control information, and for generating access information for the selected first and second virtual channels;

demultiplexing means, responsive to the access information generated by said security element, for demultiplexing the service component signals corresponding to the selected first and second virtual channels from the received frames.

3. The decoder according to claim 2, wherein:

said security element receives the extracted first control information and the extracted second control information in alternate sessions and generates access information for the selected first and second virtual channels each session; and said demultiplexing means demultiplexes the service component signals corresponding to the selected first and second virtual channels each session.

4. The decoder according to claim 2, wherein the service component signals comprise a plurality of video data streams.

5. The decoder according to claim 2, wherein the service component signals comprise a plurality of audio data streams.

6. The decoder according to claim 2, wherein the service component signals comprise video data streams, audio data streams, and text data streams.

7. A method for authorizing multiple virtual channels simultaneously, the method comprising the steps of:

determining access information for a first selected virtual channel in a first time period;

storing the access information for the first selected virtual channel;

determining access information for a second virtual channel in a second time period;

providing the access information for the first selected virtual channel and for the second selected virtual channel to a demultiplexer in the second time period;

extracting service component signals corresponding to both the first and second selected virtual channels from a multiplex of service component signals; and simultaneously outputting the extracted service component signals to user equipment.

8. The method according to claim 7, further comprising the steps of:

storing the access information for the second selected virtual channel;

determining access information for the first selected virtual channel in a third time period;

providing the access information for the first and second selected virtual channels to the demultiplexer in the third time period;

extracting service component signals corresponding to both the first and second selected virtual channels from the multiplex of service component signals; and simultaneously outputting the extracted service component signals to user equipment.

9. The method according to claim 8, wherein the access information for the first and second selected virtual channels comprises location information identifying the location of the service component signals corresponding to the first and second virtual channels, respectively, in the multiplex of service component signals.

10. The method according to claim 9, wherein the access information for the first and second selected virtual channels further comprises decryption information for enabling the demultiplexer to decrypt the service component signals corresponding to the first and second virtual channels, respectively, in the multiplex of service component signals.

11. The method according to claim 7, further comprising the steps of:

storing the access information for the second selected virtual channel;

determining access information for additional selected virtual channels in additional time periods;

storing the access information for each additional selected virtual channel;

providing the access information for the first, the second, and each additional selected virtual channel to the demultiplexer;

extracting service component signals corresponding to the first, the second, and each additional selected virtual channels from the multiplex of service component signals; and simultaneously outputting the extracted service component signals to user equipment.

12. A decoder for use in a multiservice communication system for communicating information in a sequence of multiplexed frames, the sequence of multiplexed frames including a plurality of service component signals and control information packets, each control information packet corresponding to a virtual channel of service and each virtual of channel of service being formed of one or more service component signals, wherein the sequence of multiplexed frames is divided into a plurality of sessions, each session including control information packets for each virtual channel of service supported by the multiservice communication system, said decoder comprising:

a security element, responsive to a simultaneous selection of N virtual channels by a user, where N is an integer greater than one, for receiving the control information packets corresponding to the N selected virtual channel in successive sessions and for generating access information for each of the N selected virtual channels each session; and a demultiplexer, responsive to the access information, for demultiplexing the service component signals of the N selected virtual channels from the plurality of service component signals multiplexed in the sequence of frames.

13. The decoder according to claim 12, wherein N is two and said security element receives the control information packets corresponding to the two selected virtual channel in alternating sessions and generates access information for the two selected virtual channels each session.

14. The decoder according to claim 12, wherein the service component signals comprise a plurality of video data streams.

15. The decoder according to claim 12, wherein the service component signals comprise a plurality of audio data streams.

16. The decoder according to claim 12, wherein the service component signals comprise video data streams, audio data streams, and text data streams.

* * * * *